March 12, 1929.  A. H. MEISENHEIMER  1,704,949

CONTROL SWITCH

Filed Feb. 9, 1927

Inventor
Allen H. Meisenheimer
By  H. E. Smith
Attorney

Patented Mar. 12, 1929.

1,704,949

UNITED STATES PATENT OFFICE.

ALLEN H. MEISENHEIMER, OF SPOKANE, WASHINGTON.

CONTROL SWITCH.

Application filed February 9, 1927. Serial No. 166,920.

My present invention relates to improvements in control switches for use in electric signaling systems, which, while hereinafter referred to as part of the equipment of an automotive vehicle, may also be used in connection with water-craft and aircraft for controlling electric signals. In the present exemplification of my invention I have shown a switch especially adapted for use on the steering post or column of an automobile for controlling traffic signals on the vehicle that are selectively illumined by electric lamps in circuits controlled by the switch. The control switch of my invention is of the type employing a pivoted contactor or switch lever which co-acts selectively with one of a plurality of contacts arranged in the arc of a circle and in a plane for sliding contact with the switch lever or contactor.

The several contacts are designed to be depressed, after selection, by the pressure applied to the contactor, for contact with an electro-magnet for completing the signal circuit and the magnet is utilized for holding the contact in depressed position and thus maintaining the circuit. Means are provided in connection with the contactor or switch lever for breaking the electro-magnet circuit to release the depressed contact, and means are provided for restoring the depressed and released contactor to normal position. When the switch is used on an automotive vehicle in connection with a traffic signal system the motorist may indicate to a pedestrian, motorists, and others his intended turns, stops, and other maneuvers, and different signals may be illumined by electric lamps controlled by the switch.

The signal lamps are each included in a lamp circuit, and a pilot lamp is also used which is included in all the circuits, as a detector, to indicate whether or not the selected circuit is closed or open. As herein illustrated the pilot lamp and control switch are located at the head of the steering column of the automotive vehicle where they are readily accessible for use by the motorist, and the signals of the system are located at suitable and convenient points about the vehicle.

In the accompanying drawings I have illustrated one complete example of the physical embodiment of my invention wherein the parts are combined and arranged according to the best mode I have thus far devised for the practical application of the principles of my invention.

Figure 1:
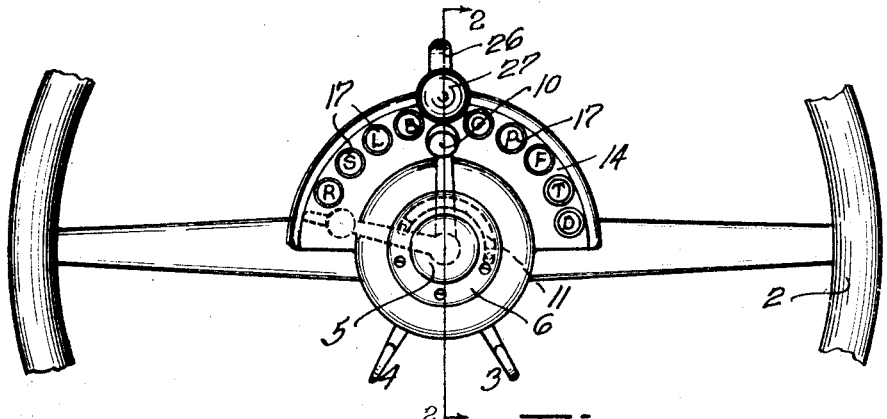
Figure 1 is a plan view of the control switch showing its relation to the steering wheel and indicating by dotted lines the position of the contactor or switch lever for de-energizing the electro-magnet to release a contact member.
Figure 5:
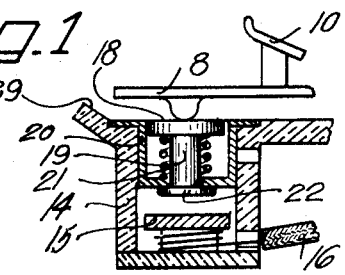
Figure 5 is an enlarged sectional detail view of one of the depressible contacts, in open or normal uplifted position.

In order that the general arrangement of parts may be readily understood I have indicated the steering column as 1, the steering wheel as 2 and the fuel control lever and ignition control lever as 3 and 4 respectively, the latter being pivoted at the center of the steering column. The button 5 of the horn control switch is carried at the top of the cap 6, and this cap is fashioned with a slot 6' for the accommodation of the switch lever or contactor. The cap is secured to the top of the steering column by means of bolts as 7 and the switch lever or contactor 8 is fashioned of resilient metal and pivoted at 9 at the axial center of the steering column. The lever projects through the slot 6' of the cap and is designed to be swung through the arc of a circle when selecting a signal to be operated. On the upper surface of the lever or contactor is provided a head 10 against which the thumb or finger may be applied for the purpose of swinging the contactor in a horizontal plane and for bending it downwardly to depress a contact and close a circuit. The contactor rests upon a semi-circular or arcuate shaped conductor plate 11 which is used for a grounding bar in the electric circuits while the bar is in contact with the lever. When the lever or contactor 8 is moved to dotted position in Figure 1, free from the bar, the electric circuits are broken. The wires or cables from this grounding bar are indicated at 12 and are passed down through the tube 13 of the steering column for proper attachment.

The switch device includes a semi-circular or arcuate-shaped box 14 disposed at a portion of the periphery of the cap 6 and in the bottom portion of the box is located an electromagnet 15 with a wire 16 extended to and grounded at the steering column. In the box and located above the electromagnet are arranged a number of contacts indicated as a whole by the numeral 17 and provided with letters as R, S, L, B, G, P, F, T, D, indicating a right turn, stop, left turn, and other traffic signals.

Figure 2:
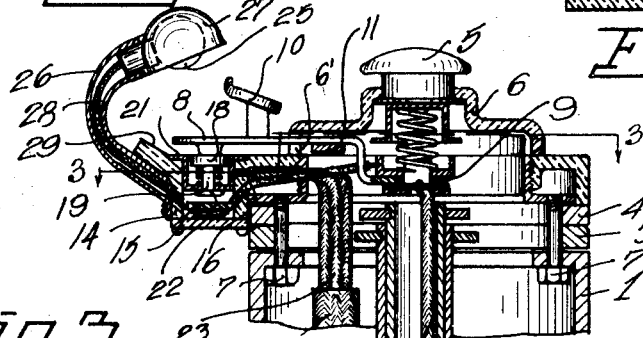
Figure 2 is an enlarged vertical sectional view of the switch mechanism on line 2—2 of Figure 1.
Figure 4:
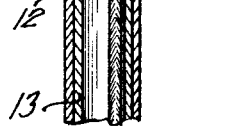
Figure 4 is a sectional detail view of the cap used at the top of the steering column in connection with the switch mechanism.
Figure 3:
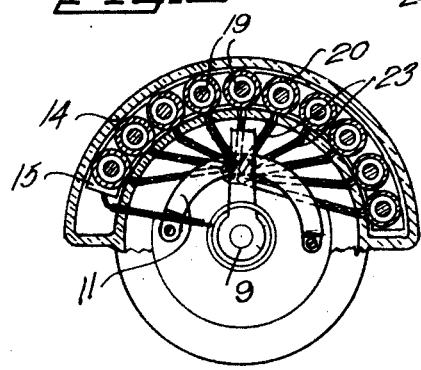
Figure 3 is a horizontal sectional view at line 3—3 of Figure 2.

Each of these contacts comprises an upper head 18 (on which the signal data is displayed) a stem 19 adapted to reciprocate in a cup 20, and a spring 21 between the head and the bottom of the cup normally holds the head in uplifted position and returns it to such position after the contact has been depressed and released. At the lower end of the stem, below the cup, is provided a contact head 22 designated to frictionally engage and electrically contact with the electromagnet below it. Thus the switch lever or contactor may be swung to position over the selected contact 17, then the lever bent to depress the contact and the latter is forced downwardly into contact with the electromagnet to complete a signal circuit, and the contact member is held by the magnet as long as the lever 8 is in contact with the grounding bar 11. The several wires as 23 for the different signal circuits are brought together into a cable 24 in Figure 2 and thence are distributed in suitable manner to form the various lamp circuits of the signal system.

A pilot light or lamp 25 is used to indicate whether or not a circuit is operating, and this light as a detector is included in the signal circuits to be illumined when a signal circuit is closed. The lamp 25 is supported in a bracket 26 and a reflector 27 for the lamp is used to illuminate the switch device, the wires 28 from the lamp being passed through the hollow bracket 26 to the cable 24, and an auxiliary reflector 29 is carried by the bracket to assist in illuminating the dial or arcuate switch box.

It will be apparent that by depressing the resilient contactor or lever 8, a contact is forced down into contact with the electromagnet to close a signal circuit, and while the lever 8 is retained in contact with the grounding bar the signal is displayed. By moving the lever to dotted position in Figure 1 where it is free from the bar, the circuit is broken, the electromagnet is de-energized and the depressed contact is freed, whereupon the spring 21 returns it to normal uplifted position.

Having thus fully described my invention what I claim as new and desire to secure by Letters Patent is—

In a control switch the combination with a resilient pivoted lever of a spring pressed, depressible contact and its supporting cup adapted to be depressed by said lever, an electromagnet below the contact for electrical connection therewith, and a grounding bar in the path of the lever, whereby the electromagnet may be de-energized when the lever is separated from the grounding bar.

In testimony whereof I affix my signature.

ALLEN H. MEISENHEIMER.